(12) United States Patent
Zielinski et al.

(10) Patent No.: US 11,223,969 B2
(45) Date of Patent: Jan. 11, 2022

(54) METHOD AND APPARATUS FOR PREDICTING A QUALITY OF SERVICE FOR THE COMMUNICATION ABOUT AT LEAST ONE COMMUNICATION LINK OF AT LEAST ONE COMMUNICATION DEVICE, COMMUNICATION SERVICE PREDICTION SERVER AND COMPUTER PROGRAM

(71) Applicant: Volkswagen Aktiengesellschaft, Wolfsburg (DE)

(72) Inventors: Ernst Zielinski, Bochum (DE); Ahmad El Assaad, Wolfsburg (DE); Andreas Kwoczek, Lehre (DE); Guillaume Jornod, Berlin (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 16/589,755

(22) Filed: Oct. 1, 2019

(65) Prior Publication Data
US 2020/0107212 A1    Apr. 2, 2020

(30) Foreign Application Priority Data

Oct. 2, 2018  (EP) ..................... 18198192

(51) Int. Cl.
*H04W 28/02* (2009.01)
*H04W 4/46* (2018.01)
(Continued)

(52) U.S. Cl.
CPC ......... *H04W 28/021* (2013.01); *H04L 47/127* (2013.01); *H04W 4/46* (2018.02); *H04W 64/006* (2013.01)

(58) Field of Classification Search
None
See application file for complete search history.

(56) References Cited

U.S. PATENT DOCUMENTS

2016/0196527 A1   7/2016  Bose et al. .............. 705/332
2018/0139593 A1   5/2018  Chun et al.
(Continued)

FOREIGN PATENT DOCUMENTS

DE   102012103694 A1   10/2013   ............. G08C 17/02
EP       1324628 B1    11/2009   ............. H04L 12/54
(Continued)

OTHER PUBLICATIONS

Extended European Search Report, Application No. 18198192.9, 12 pages, dated Nov. 30, 2018.

*Primary Examiner* — James P Duffy
(74) *Attorney, Agent, or Firm* — Slayden Grubert Beard PLLC (57) ABSTRACT

The present disclosure concerns a method for predicting a quality of service for a communication about at least one communication link of at least one communication device. QoS prediction may be necessary when it comes to the case that a user wants to use an application where a certain type of QoS is a presumption. For getting the best estimate of the quality of service the method comprises the steps of sending from the communication device a quality of service prediction request message hereinafter called QoS prediction request message to a communication service prediction server, predicting the quality of service in the communication service prediction server and sending back a quality of service prediction response message to the communication device. The communication device can thus decide if the predicted QoS is sufficient for the planned activity and may take a decision to either start the activity, postpone the activity or alter the activity.

18 Claims, 5 Drawing Sheets

(51) Int. Cl.
*H04L 12/801* (2013.01)
*H04W 64/00* (2009.01)

(56) References Cited

U.S. PATENT DOCUMENTS

2018/0184339 A1    6/2018  Hehn et al.
2019/0174498 A1*   6/2019  Samdanis ............. H04W 16/10
2021/0114616 A1*   4/2021  Altman ................ H04W 40/02

FOREIGN PATENT DOCUMENTS

| EP | 3203188 A1 | 8/2017 | ............. G01C 21/34 |
| WO | 2014/071974 A1 | 5/2014 | ............. H04W 28/16 |
| WO | 2018/103865 A1 | 6/2018 | ............. H04L 29/06 |

* cited by examiner

METHOD AND APPARATUS FOR PREDICTING A QUALITY OF SERVICE FOR THE COMMUNICATION ABOUT AT LEAST ONE COMMUNICATION LINK OF AT LEAST ONE COMMUNICATION DEVICE, COMMUNICATION SERVICE PREDICTION SERVER AND COMPUTER PROGRAM

CROSS-REFERENCE TO RELATED APPLICATIONS

This application claims priority to European Patent Application EP 181 98 192.9, filed on Oct. 2, 2018 with the European Patent Office. The contents of the aforesaid Patent Application are incorporated herein for all purposes.

TECHNICAL FIELD

The disclosure relates to a method and apparatus for predicting a quality of service for the communication about at least one communication link of at least one communication device. The disclosure also discloses a communication service prediction server and a corresponding computer program.

BACKGROUND

For the scenario of vehicles equipped with wireless communication modules that provide connectivity to public communication networks but also provide a direct communication capability for exchanging information among the road participants, wireless communication offers the opportunity to implement a wide range of applications. A lot of research concerns the fields of cooperative and autonomous driving. Direct communication between vehicles is often referred to be vehicle-to-vehicle communication (V2V). Also possible is communication from and to a vehicle with infrastructure communication stations such as a roadside unit RSU. Such type of communication is often referred to be vehicle-to-everything communication (V2X.

Autonomous driving (sometimes referred to as automatic driving, automated driving or piloted driving) is the movement of vehicles, mobile robots and driverless transport systems which are largely autonomous. There are different degrees of autonomous driving. In this case, autonomous driving is also spoken at certain levels even if a driver is still present in the vehicle, who possibly only takes over the monitoring of the automatic driving operation. In Europe, various transport ministries, for example in Germany, the Federal Institute for Road Systems (Bundesanstalt für Strassenwesen) was involved, worked together and defined the following autonomous stages.

Level 0: "Driver only", the driver drives himself, steers, gives gas, brakes, etc.

Level 1: Certain assistance systems help with vehicle operation (including a cruise control system—Automatic Cruise Control ACC).

Level 2: Partial automation. Therein, automatic parking, tracking function, general longitudinal guidance, acceleration, deceleration, etc. are taken over by the assistance systems (including collision avoidance).

Level 3: High automation. The driver does not have to monitor the system continuously. The vehicle independently performs functions such as the triggering of the turn signal, lane change and tracking. The driver can turn to other things, but if requested, the system is requested to take over the lead within a pre-warning period. This form of autonomy is technically feasible on motorways. Legislators are working to allow Level 3 vehicles. The legal framework has already been created.

Level 4: Full automation. The guidance of the vehicle is permanently adopted by the system. If the system is no longer able to handle the tasks, the driver can be asked to take the lead.

Level 5: No driver required. Apart from setting the target and starting the system, no human intervention is required.

A slightly different definition of levels is known from the Society of Automotive Engineers SAE for a pan-European cooperation on this matter. This could also be used instead of the above given definition. Future cooperative driving applications are envisioned to significantly improve efficiency and comfort of automated driving. Increase in cooperation between vehicles pose specific requirements on communication system and the way messages are exchanged among cooperating vehicles.

Typical communication scenarios for V2V communication are road safety scenarios, traffic efficiency scenarios and infotainment scenarios. From the road safety scenarios the following examples are mentioned: "Cooperative Forward Collision Warning", "Pre-Crash-Detection/Warning", "Lane change warning/blind spot warning", "Emergency Electric Brake Light Warning", "Intersection Movement Assist", "Emergency Vehicle Approaching", "Road Works Warning" (non-exhaustive list). From the traffic efficiency scenarios the "High-Density Platooning" is mentioned. The high density platooning application could also be regarded to be an example of the road safety scenarios, because the cooperative driving of a plurality of vehicles in a convoy with small distance (<10 m) is very critical in terms of the safety requirements. Particularly in the field of high density platooning, the vehicles in a convoy need to exchange a plurality of messages. Typically, the entire convoy is controlled by a vehicle configured as a lead vehicle, it is called platoon leader. For example, a feedback of information about an intended braking maneuver is planned from the front to the rear in order to avoid rear-end collisions.

Currently the following mobile communication technologies are applicable for bringing connectivity to a vehicle: 3GPP-based UMTS, HSPA, LTE, and the upcoming 5G standards.

For the V2V or V2X communication the following technologies are readily available. LTE-V sidelink communication, also called PC5 interface, 5G PC5 sidelink communication, WLAN p communication (IEEE 802.11p). The present disclosure is mainly concerned with the communication in LTE networks or 5G networks as well as technologies beyond 5G networks.

Autonomous driving is on the rise. Though it has been demonstrated that autonomous vehicles can rely on their own sensors for environmental scanning, it is foreseen that they can greatly benefit from cooperation with surrounding vehicles, either in terms of control or in terms of perception. This cooperation is supported by V2V or in general V2X communication.

Communication standards define performance metrics for communication technologies such as minimums, maximums, averages, etc. of some key performance indicators KPIs. The indicators, such as latency $\tau$ of a data communication, throughput $T_h$, data rate $D_R$, packet error rate PER, vary within and around these values, sometimes drastically dropping or increasing. This variation can drastically affect the quality of applications. For safety-related applications, such as some applications of cooperative automated driving, the average achievable latency with best effort policy does not comply with the quality requirements of the automotive industry for instance. Especially when it comes to V2V and V2X and time critical safety related applications, this potential variation and this absence of guaranty of quality of service seriously QoS affects the potential use of such technologies.

Indeed, the design of a cooperative function will take the worst-case scenario for functional safety reasons. As a result, the performance of the cooperative function will be most likely the one of the individual system thus yielding to a limited advantage of the V2X technology.

A novel concept of adaptation of the application to the quality of service, the so-called Agile Quality of Service Adaptation (AQoSA) is emerging within the automotive industry AQoSA is a key enabler for these types of use cases. The basic idea of the AQoSA principle is three-fold:

The application informs the network about its communication requirements and updates these requirements whenever they change.

The network predicts its capabilities to fulfill the requirements and informs the application whenever the prediction changes.

The application reacts to these changes by adapting its own settings and its operation mode.

The AQoSA principle can advantageously be used in connection with Network Slicing, the latter furnishes a convenient means for applications to signal requirements to the network. This implies that Network Slicing is agile enough to accept AQoSA signals not only on a one-time basis but multiple times, i.e. whenever the application sees a need to inform the network about an update. In a nutshell, network slicing is the embodiment of the concept of running multiple logical networks as virtually independent business operations on a common physical infrastructure in an efficient and economical way. Slice types could be defined from a functional or behavioral perspective. It is therefore anticipated that mobile network operators could deploy a single network slice type that satisfies the needs of multiple business customers who have multiple and diverse requirements (for example a vehicle may need simultaneously a high bandwidth slice for infotainment and an ultra-reliable slice for telemetry assisted driving. However, the resources of a communication system are limited. Therefore, the prediction of quality of service may be a function of network slicing. It shall inform the automotive application which QoS are expected within a time horizon.

Concerns for the automotive industry for a respective slice could be ubiquitous coverage, link capacity, end-to-end communication latency, both in terms of dense national coverage (everywhere, including remote areas), as well as in terms of global availability. However, connectivity should also be reliable and predictable. To this end, network status information for a given route may help here, as well as QoS mechanisms in the network.

However, considering the tight time constraints that are generally characterizing automotive safety-related applications, reacting to the QoS might not be sufficient, considering the involved adaptation delays for instance. This is where the concept of QoS prediction intervenes.

From DE 10 2012 103 694 A1 a radio station is known, which is capable to communicate in a mobile communication system and performs measurements on the radio signals of the mobile communication system. Based on these measurements the radio station determines the quality of service of the mobile communication system and decides if the transmission of its data is possible.

In EP 1 324 628 B1 a solution is described which is basically dedicated to an adaptive QoS management unit running on mobile nodes (MNs) targeted to support adaptive real-time applications to dynamically adapt to a time-varying node connectivity and different radio link characteristics. It supports different access technologies in dynamic wireless Internet Protocol (IP) networks by giving services the possibility to pre-allocate, reserve, monitor and adapt different QoS-related parameters.

There may be a need for a concrete system design for implementing a reliable QoS prediction function. A lot of design and implementation details need to be elaborated before such conceptual idea will be approved in standardizing bodies.

SUMMARY

These and other objects are solved with a method for predicting a quality of service for a communication about at least one communication link of at least one communication device, a corresponding apparatus, a communication service prediction server, and a corresponding computer program according to the independent claims.

The dependent claims and of the following discussion provide embodiments of the method, device, and computer program according to the disclosure.

In one aspect, the present disclosure provides a method for predicting a quality of service for a communication about at least one communication link of at least one communication device. The method comprises sending from the communication device a quality of service prediction request message, also called QoS prediction request message or QPREQ, to a communication service prediction server, predicting the quality of service in the communication service prediction server and sending back a quality of service prediction response message to the communication device.

DETAILED DESCRIPTION

In one aspect, the present disclosure provides a method for predicting a quality of service for a communication about at least one communication link of at least one communication device. The method comprises sending from the communication device a quality of service prediction request message, also called QoS prediction request message or QPREQ, to a communication service prediction server, predicting the quality of service in the communication service prediction server and sending back a quality of service prediction response message to the communication device.

To position the prediction function in the network may be considered the best place, since a lot of information is needed from the network to accurately predict the quality of service.

In some embodiments, the present discussion concerns the idea that the QoS prediction request message (QPREQ) comprises in a payload section information entries for at least a planned travel route of the communication device and the communication link capacity requirements for a service the communication device is planning to make use of, wherein the payload section may optionally include an information entry for the planned starting time. This idea is well adapted to the important scenario of planning a navigation route for a vehicle and making extensive use of the communication capability of the vehicle, be it V2V, V2X or V2N communication. A prominent example from the logistics industry is the planning of the so-called "high density platooning" for delivering goods with trucks over a wide distance. Since high density platooning requires the coordinated control of the inter-vehicle distance, which is safety critical, a good quality of service is required for the V2V communication needed for coordinating the platoon members.

In some embodiments, the present discussion concerns the idea that said QoS prediction request message further comprises in said payload section one or both of the information entries for the communication link identifiers the communication device is equipped with and the communication link reliability requirements for a service the communication device is planning to make use of. This information helps the QoS prediction function in the network to pre-select certain types of communication services which may be appropriate.

In some embodiments, the method further comprises a step of sending a QoS prediction request acknowledge message from said communication service prediction server to said communication device, wherein said QoS prediction request acknowledge message includes an information entry for the conditions the communication service prediction server will accept an updated QoS prediction request message from the same communication device. This is important since the QoS prediction request message cause a high calculation expenditure in the communication service prediction server, such that the access to this server needs to be limited.

In some embodiments, it is beneficial that the QoS prediction response message comprises in a payload section information entries for at least the predicted communication link capacity of said at least one communication link. The communication link capacity is the most important criterion for deciding if the quality of service is sufficient for the planned activity.

In some embodiments, the method comprises that the QoS prediction response message further comprises in said payload section one or more of the information entries a predicted communication link reliability, a predicted communication link capacity confidence, a predicted communication link reliability, a validity time for the QoS prediction and a service start time for which the prediction is valid. With such further information entries, the requesting communication device can very accurately determine if the planned activity could be started.

In a corresponding apparatus for predicting a quality of service for a communication over at least one communication link of at least one communication device and in another aspect, it is beneficial if the communication device is comprising a QoS prediction function block and a communication cell localization block for determining the communication cells along the planned travel route for which the QoS prediction function block shall predict the QoS. This is very important if the planned activity is making use of a cell-based mobile communication system since the communication device will only be booked in the cells along the travel route.

In some embodiments, the apparatus further comprises a channel modelling prediction block that predicts a communication channel model profile which is forwarded to the QoS prediction function block. An accurate channel model is required to predict the quality of service at different times. When the communication device is moving along the travel route, the channel model changes with time and position. Therefore, the best way to adapt the prediction function correspondingly is supplying the prediction function with a channel model profile comprising different channel model for different times and places.

In some embodiments, the apparatus further comprises a traffic flow prediction block that predicts the amount of other communication devices in the region along the planned travel route, where said traffic flow prediction block is connected with the channel modelling prediction block in order to inform the channel modelling prediction block about the traffic density and thus about the load on the channel for which the channel model will be predicted.

In some embodiments, the apparatus further comprises a surroundings prediction block that predicts the surroundings of the communication device when travelling along the planned travel route, where said traffic surroundings prediction block is connected with the channel modelling prediction block to inform this block accordingly. This is helpful since the quality of service might be affected by static and dynamic obstacles for the communication in the surroundings such as buildings, other landmarks, topographical conditions, etc. This block may make extensive use of corresponding detailed maps. But also it may make use of information from other vehicles equipped with surroundings observation sensors.

For this purpose, the channel modelling prediction block, the communication cell localization block, and the surroundings prediction block may have inputs for the information about the planned travel route and the planned starting time of the requesting communication device. This information could be taken from the QoS prediction request message.

In some embodiments, a communication service prediction server is equipped with such kind of apparatus.

In another aspect, a corresponding computer program comprises program code, which when run in a processing device performs the steps of the communication service prediction server in the method according to the first aspect.

Further exemplary embodiments of the present disclosure are shown in the drawing and are explained in greater detail in the following description.

The present description illustrates the principles of the present disclosure. It will thus be appreciated that those skilled in the art will be able to devise various arrangements that, although not explicitly described or shown herein, embody the principles of the disclosure.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams presented herein represent conceptual views of illustrative circuitry embodying the principles of the disclosure.

The functions of the various elements shown in the figures may be provided by the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

Figure 1:
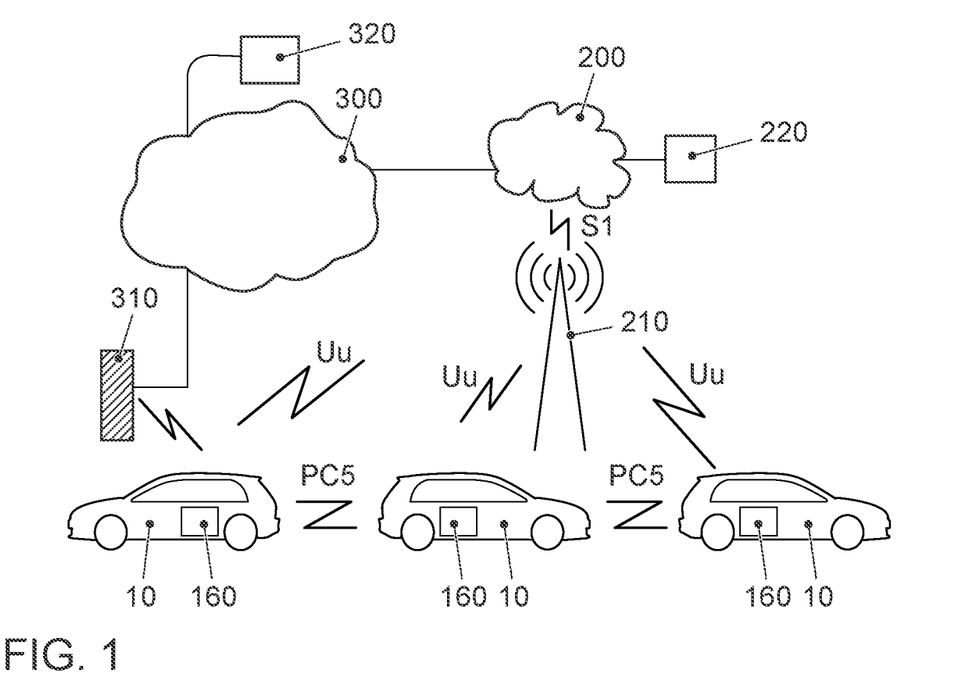
FIG. 1 illustrates the principle architecture of a V2V and V2X communication system.

FIG. 1 shows an embodiment of the system architecture according to the present discussion. Reference number 10 denotes a user device. The depicted user device is exemplified as a vehicle and more in particular it is a car. In other examples it may be differently exemplified, e.g. a smart phone, a smart watch, a tablet computer, notebook or laptop computer or the like. Shown is a passenger car. If exemplified with a vehicle, it may be any type of a vehicle. Examples of other types of vehicles are: buses, motorcycles, commercial vehicles, in particular trucks, agricultural machinery, construction machinery, rail vehicles, etc. This system may be used generally in land vehicles, rail vehicles, watercrafts, and aircrafts, without limitation. The vehicle 10 is equipped with an on-board connectivity module 160 including corresponding antenna such that the vehicle 10 can participate in any form of a mobile communication service. FIG. 1 illustrates that vehicle 10 may transmit and receive signals to and from a base station 210 of a mobile communication service provider.

Such a base station 210 may be an eNodeB base station of an 5G mobile communication service provider. The base station 210 and the corresponding equipment is part of a 5G mobile communication network with a plurality of network cells where each cell is served by one base station 210.

The 5G network architecture is similar to the LTE (Long Term Evolution) network architecture and comprises the three subsystems: the User Equipment (UE), the Access Network (AN) and the Core Network (CN).

In LTE networks, the E-UTRAN is the Access Network for LTE; it uses OFDMA in the radio interface to communicate with the User Equipment. A so-called Evolved Packet Core (EPC) is used in the Core Network to provide an all-IP architecture to give access to various services e.g. Internet service.

The Quality of Service (QoS) of IP services can be adjusted according to the requirements of each service (e.g. bitrate, lags, Bit Error Rate . . . ). Its signaling is communicated through external services platforms (e.g. IMS) transparently to the EPC Core Network.

In LTE, the IP packet transfer service between the UEs and an external network is called EPS Bearer Service. Likewise, the packet transfer service provided by the Access Network is called E-UTRAN Radio Access Bearer (ERAB).

The interconnection between the physical equipment in both the EPC and E-UTRAN is done through IP network-based technologies, so that the transport network is a conventional IP network. This way, any LTE network infrastructure contains IP elements such as routers, DHCP servers and DNS servers.

The base station 210 in FIG. 1 is positioned close to a main road on which the vehicle 10 is driving. Of course, other vehicles may also drive on the road. In the terminology of LTE, a mobile terminal corresponds to a user equipment UE, which allows a user to access network services, connecting to the UTRAN or Evolved-UTRAN via the radio interface. Typically, such user equipment corresponds to a smart phone. Of course, mobile terminals are also used in the vehicles 10. The cars 10 are equipped with said on-board connectivity module OCU 160. This OCU corresponds to an LTE communication module with which the vehicle 10 can receive mobile data in downstream direction and can send such data in upstream direction. This OCU 160 is further equipped with multi-RAT technology corresponding to radio access technology. Multi-RAT networks combine several radio access technologies to deliver the service to users (e.g. UMTS, LTE, Wi-Fi). For the application in vehicles and for the implementation of V2V and V2X communication capability primarily the following technologies will be combined: LTE-V corresponds to the 4G mobile communication technology, LTE PC5 corresponds to the 5G mobile communication technology and WLAN p, corresponds to the IEEE 802.11p communication technology.

In terms of the LTE mobile communication system, the Evolved UMTS Terrestrial Radio Access Network E-UTRAN of LTE consists of a plurality of eNodeBs, providing the E-UTRA user plane (PDCP/RLC/MAC/PHY) and control plane (RRC) protocol terminations towards the UE. The eNodeBs are interconnected with each other by means of the so-called X2 interface. The eNodeBs are also connected by means of the so-called S1 interface to the EPC (Evolved Packet Core) 200, more specifically to the MME (Mobility Management Entity) by means of the S1-MME and to the Serving Gateway (S-GW) by means of the S1-U interface.

As FIG. 1 depicts, a E-UTRAN Access Network may comprise ENodeBs that allow connectivity between the UEs and the EPC Core Network. A base station 210 communicates with the other elements of the system through 3 interfaces: E-UTRAN Uu, S1 and X2. The interface E-UTRAN Uu, also known as LTE Uu or simply LTE radio interface, allows data transfer between the ENodeB and the UEs. It is noted that the vehicles 10 equipped with OCU unit 160 can also be regarded as UE devices. All the functions and protocols needed for this transfer and the control operations of the E-UTRAN Uu interface are implemented in the eNodeB. The eNodeB 210 connects with the EPC Core Network 200 through the S1 interface. Optionally, the eNodeBs 210 can connect between them using the X2 interface. These connections can be used to exchange signaling messages to handle the radio resources (e.g. to reduce interference) and also to manage traffic when users move from one eNodeB 210 to another during a handover procedure.

From this general architecture FIG. 1 shows that eNodeB 210 is connected to the EPC 200 via the S1 interface and that EPC 200 is connected to the Internet 300. The backend server 320 to which the vehicles 10 send messages to and receive messages from is also connected to the Internet 300. In the field of cooperative and autonomous driving the backend server 320 typically is located in a traffic control center. An alternative arrangement is also shown in FIG. 1. With reference number 220 a communication service prediction server is labeled. The S1 interface may be reduced to practice with wireless communication technology such as with the help of microwave radio communication by means of directional antennas or wired communication technology based on fiber cables. Finally, an infrastructure network component is also shown. This may be exemplified by a road-side unit RSU 310. For the ease of implementation, it is considered that all components have assigned an Internet address, typically in the form of an IPv6 address, such that the packets transporting messages between the components can be routed correspondingly.

The various interfaces of the 5G network architecture are standardized. It is particularly referred to the various specifications, which are publicly available for the sake of sufficiently disclosing further implementation details.

The vehicles are also equipped with means for surroundings observation. The sensor system, which is used to capture the environmental objects is based on different measuring methods depending on the application. Widespread technologies are among others RADAR corresponding to Radio Detection and Ranging, LIDAR corresponding to Light detection and ranging, cameras 2D and 3D and ultrasonic sensors.

Figure 2:
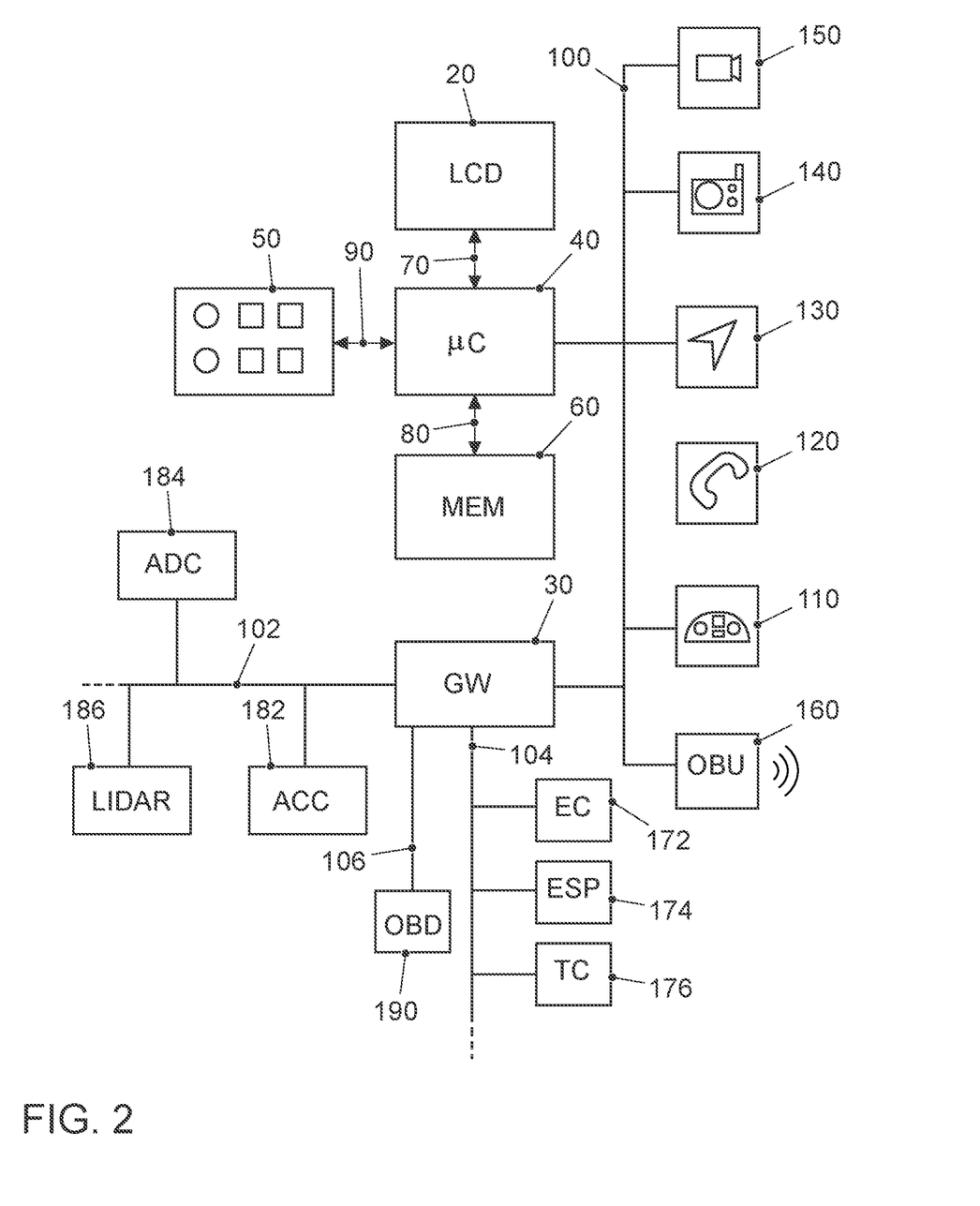
FIG. 2 shows an embodiment of a block diagram of a vehicle's electronics system.

FIG. 2 shows schematically a block diagram of the vehicle's on-board electronics system. Part of the on-board electronics system is an infotainment system which comprises: the touch-sensitive display unit 20, a computing device 40, an input unit 50, and a memory 60. The display unit 20 includes both a display area for displaying variable graphical information and an operator interface (touch-sensitive layer) arranged above the display area) for inputting commands by a user.

The memory device 60 is connected to the computing device 40 via a further data line 80. In the memory 60, a pictogram directory and/or symbol directory is deposited with the pictograms and/or symbols for possible overlays of additional information.

The other parts of the infotainment system such as camera 150, radio 140, navigation device 130, telephone 120 and instrument cluster 110 are connected via the data bus 100 with the computing device 40. As data bus 100 is the high-speed variant of the CAN bus according to ISO standard 11898-2 taken into consideration. Alternatively, for example, the use of an Ethernet-based bus system such as IEEE 802.03cg is another example. Bus systems in which the data transmission via optical fibers happens are also usable. Examples are the MOST Bus (Media Oriented System Transport) or the D2B Bus (Domestic Digital Bus). For inbound and outbound wireless communication, the vehicle 10 is equipped with a communication module 160. This communication module 160 is often referred to as an on-board connectivity module OCU as mentioned above. It can be used for mobile communication, e.g. mobile communication according to the 5G standard. It is also equipped with multi-RAT technology as mentioned above.

Reference numeral 172 denotes an engine control unit. The reference numeral 174 corresponds to an ESC control unit corresponding to electronic stability control and the reference numeral 176 denotes a transmission control unit. The networking of such control units, all of which are allocated to the category of the drive train, typically occurs with the CAN bus system (controller area network) 104. Since various sensors are installed in the motor vehicle and these are no longer only connected to individual control units, such sensor data are also distributed via the bus system 104 to the individual control devices.

However, the modern motor vehicle can also have further components such as further surroundings scanning/observing sensors like a LIDAR (Light Detection and Ranging) sensor 186 or RADAR (Radio Detection and Ranging) sensor and more video cameras, e.g. as a front camera, rear camera or side camera. Such sensors are used more and more in vehicles for surroundings observation. Further control devices, such as an automatic driving control unit ADC 184 and an adaptive cruise control unit ACC 182, etc., may be provided in the motor vehicle. There may be other systems in the vehicle, too, such as the UWB transceivers for inter vehicle distance measurement. The UWB transceivers may typically be used for a short distance observation, e.g. 3 to 10 m. The RADAR and LIDAR sensors could be used for scanning a range up to 250 m or 150 m and the cameras cover a range from 30 to 120 m. The components 182 to 186 are connected to another communication bus 102. The Ethernet-Bus is a choice for this communication bus 102 due to its higher bandwidth for data transport. One Ethernet-Bus adapted to the special needs of car communication is standardized in the IEEE 802.1Q specification. Moreover, a lot of information for surroundings observation may be received via V2V communication from other road participants. Particularly for those road participants not being in line of sight LOS to the observing vehicle it is very helpful to receive the information about their position and motion via V2V communication.

Reference number 190 denotes an on-board diagnosis interface. For the purpose of transmitting the vehicle-relevant sensor data via the communication interface 160 to another vehicle or to a central computer 320 or 220, the gateway 30 is provided. This is connected to the different bus systems 100, 102, 104 and 106. The gateway 30 is adapted to convert the data it receives via the one bus the transmission format of the other bus so that it can be distributed in the packets specified there. For the forwarding of this data to the outside, i.e. to another motor vehicle or to central computer 320, the on-board unit 160 is equipped with the communication interface to receive these data packets and, in turn, to convert them into the transmission format of the correspondingly used mobile radio standard. The gateway 30 takes all the necessary format conversions if data are to be exchanged between the different bus systems if required.

Figure 3:
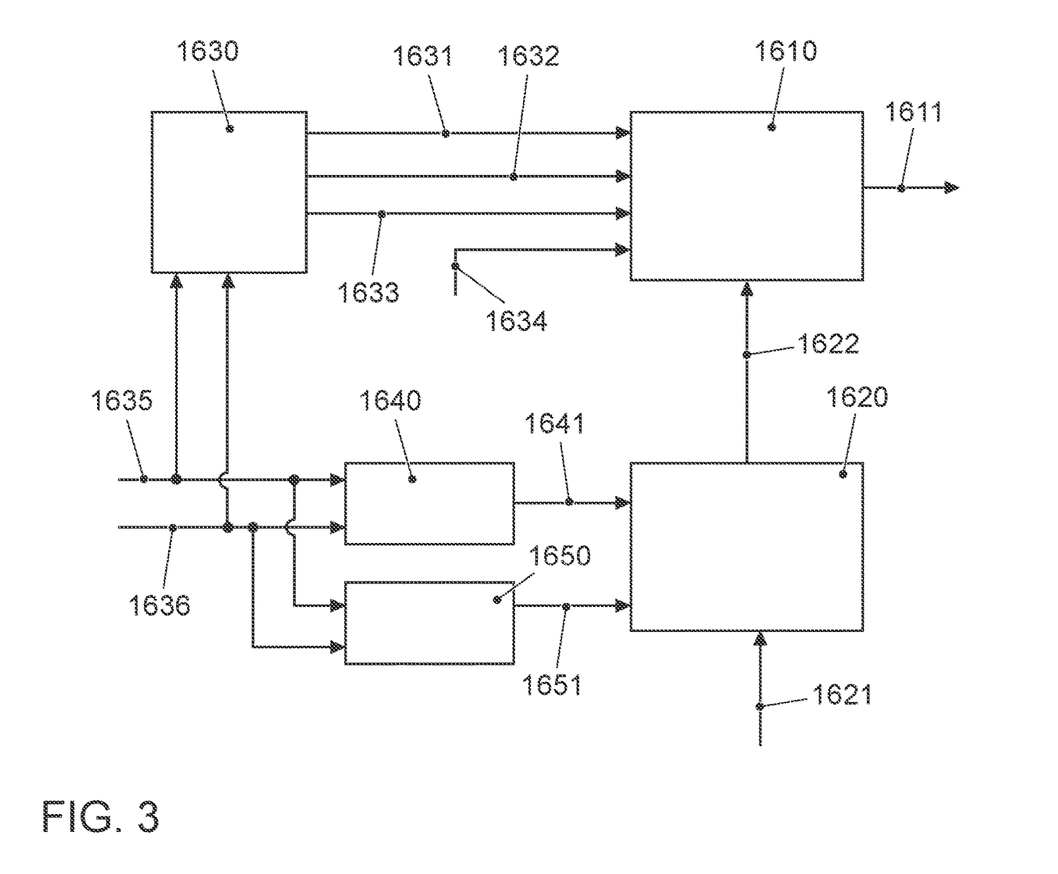
FIG. 3 shows a first block diagram of an embodiment of an apparatus for predicting a quality of service for the communication over at least one communication link of at least one communication device.

FIG. 3 shows an embodiment for an architectural concept with concrete implementation details for the above mentioned introduction of the QoS prediction function. The prediction function may be implemented in a backend server or located in the core of a mobile radio network. It is one embodiment to position the backend server at a place where anyhow a lot of information about the traffic on the roads is available, thus e.g. at the backend server 320 of a traffic control center. However, in an alternative arrangement this information about the traffic flow could be remotely accessed by the implementation of the prediction function located in the core network. Alternatively, it could be positioned at an edge cloud computer close to an eNodeB 210 of a region to which a plurality of other eNodeBs 210 belong. A further alternative position is a communication service prediction server 220 at the core network EPC.

Reference number 1610 denotes the QoS prediction function block. It is the task of the QoS prediction function block 1610 to forecast the QoS parameters for a planned V2V or V2X or V2N communication and inform the requesting vehicle accordingly. It will be further described how the QoS prediction function block 1610 will perform this task. The resulting predicted QoS parameters will be transferred back to the requesting vehicle via line 1611. The requesting vehicle then can decide for which planned communication type it would like to reserve resources. This information would be communicated in an adapted further request.

Reference number 1620 denotes a channel modelling block which performs a function of calculating a predicted channel model. The predicted channel model is an important input to the QoS prediction function block 1610. The predicted channel model could be generated in the form of a channel model profile, i.e. a plurality of channel models is calculated for different times and places. Also the channel modelling block 1620 needs reliable information to perform its task. It receives information from a traffic flow prediction block 1640 via line 1641. It may receive further input from the requesting vehicle about the frequencies or links the vehicle intends to use for its planned V2V or V2X or V2N communication via line 1621. This block estimates the load prediction, i.e. the amount of data that needs to be communicated over the various V2V or V2X or V2N channels. Here, it is seen that it is the right place to locate the prediction function block 1610 at a traffic control center, since the best estimate about the traffic density in that region should be available at the corresponding traffic control center. In addition, the channel modelling block 1620 receives information about the surroundings of the requesting vehicle via line 1651. Again this could be made available in the form of a profile, where a plurality of surrounding models would be provided for different times and places. In one embodiment, the surrounding model may contain information about obstacles from which signal reflections may occur, e.g. buildings along the road, or vehicles on the road. Static objects could be taken from corresponding detailed maps. Information about vehicles on the road may be received from vehicles equipped with corresponding surroundings scanning/observing sensors as mentioned above.

Both blocks, traffic flow prediction block 1640 and surroundings modelling block 1650 receive information about the planned route of a vehicle and the corresponding time or a time period in which the route will be started. Optionally, the surroundings modelling block 1650 may also get information about the surroundings observation from the requesting vehicle.

Reference number 1630 denotes a cells locating block. In this block the mobile communication cells along the path following the planned route of the requesting vehicle will be determined. The determined cell identifiers will be forwarded to the prediction function block 1610 on line 1632. Also this information in one embodiment could be taken from a corresponding detailed map. Moreover, this cells location block further includes a scheduling function block which typically comprises the same type of scheduling algorithms which are also applied in the scheduler of an eNodeB 210. The result of the scheduling operation will be forwarded to the prediction function block 1610 on line 1631. Also the assigned resources, i.e. the resource blocks which the scheduling algorithm in the cells locating block 1630 assigned for the requested communication type will be forwarded to the prediction function block 1610. This type of information will be transported over line 1633. Via line 1634 the information from the requesting vehicle about the communication type which is planned, the QoS requirements for the respective planned communication type, the requested prediction horizon and the requested prediction reliability is forwarded to the prediction function block 1610.

In summary, the prediction function block 1610 may perform the prediction function on different levels, one may be the link level where it will be determined which communication link provides which quality of service level. Second, the prediction function block 1610 may perform the prediction function on the system level, where resource blocks are pre-allocated and where it will be determined what the estimated QoS parameter values such as block error rate/packet error rate, end to end latency, throughput, etc. are.

Figure 4:
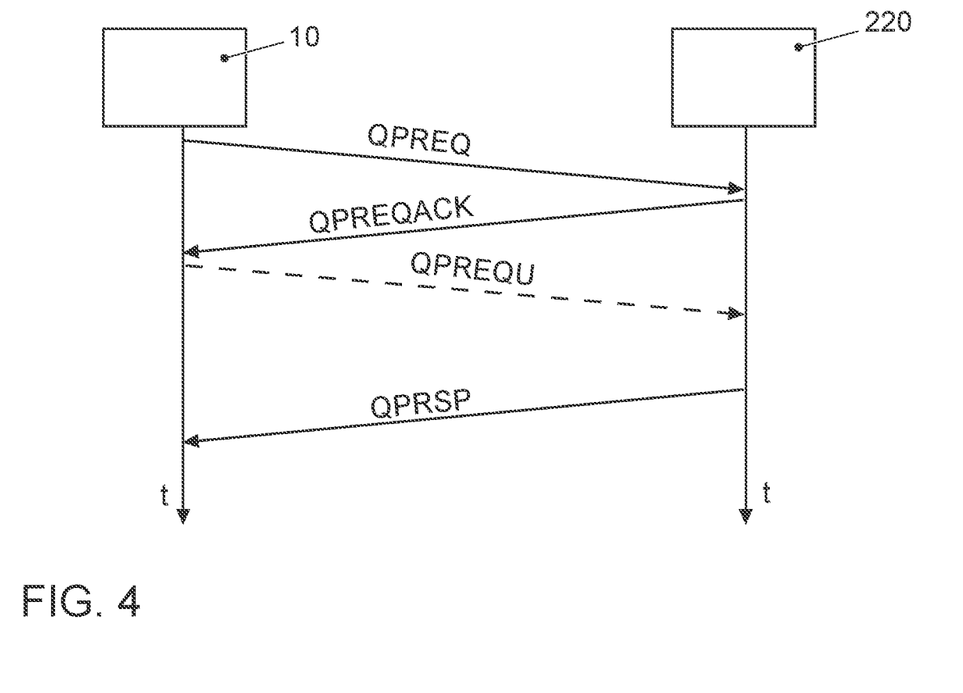
FIG. 4 shows a diagram illustrating an exemplary message exchange between a communication device and the apparatus for predicting a quality of service.

FIG. 4 shows the message exchange process between the requesting vehicle 10 and the communication service prediction server 220.

If a passenger in a vehicle is planning a travel route with the vehicle's navigation system, he may also wish to perform certain activities during the travel. First of all he may want to drive on his own manually or he may want to use the automated driving capability of the vehicle. If he wants to use automatic driving, the vehicle has tighter requirements for V2V and V2X communication than if the vehicle is manually steered. In addition, when automatic driving is planned, the passenger may want to use other services during the ride which also cause tighter requirements for V2N communication. Examples of such activities are watching TV or video, surfing on Internet, listening to music, online gaming, performing telephone or videophone calls, etc. To get the best connectivity for the planned activity during the ride, it is an idea of the disclosure to inform the network operator beforehand about the travel route and optionally about the planned activities and receive back from the network operator a forecast about the service quality he could provide. With service quality it is meant the quality of the different supported communication types such as V2V, V2X, or V2N. Alternatively, it could be the quality for certain services such as watching TV or video, surfing on Internet, listening to music, online gaming, performing telephone or videophone calls, etc. The customer then has a choice if that is acceptable for him. If the service quality is not good enough, he may want to select another route or he could plan a different activity.

FIG. 4 shows that a QoS prediction request message QPREQ is sent from vehicle 10 to the communication service prediction server 220 of the network operator. The communication service prediction server 220 responds to the requesting vehicle with a QoS prediction request acknowledge message QPREQACK. This acknowledge message may include an update condition with which the service prediction server 220 announces under which conditions the server would accept an updated QoS prediction request message QPREQ of the same vehicle. This way it is possible to restrict access to the communication service prediction server 220. This is needed since each request causes a high calculation expenditure at the server. The update condition might be an information regarding a minimum waiting time, a restriction in number of requests per time period, e.g. day, a service fee for using the communication service prediction server 220, etc. The following dashed line in FIG. 4 illustrates the event that the vehicle 10 sends an updated QoS prediction request message QPREQU. Later in time the communication service prediction server 220 sends a QoS prediction response message QPRSP to either the original QoS prediction request message QPREQ or the updated QoS prediction request message QPREQU.

Figure 5:
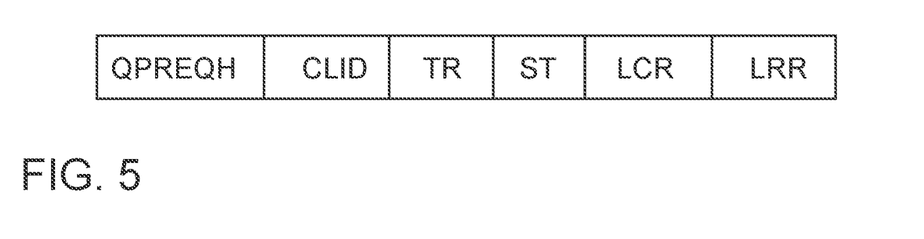
FIG. 5 shows an exemplary message format for a quality of service prediction request message.

FIG. 5 shows the message format of the QoS prediction request message QPREQ. With reference sign QPREQH the message header is denoted. In the message header there is at least an entry for message type and another entry for the UE address the message is coming from. As explained before, the on-board connectivity unit 160 has implemented a qualified UE category. Any form of appropriate address information could be used here. Examples are Media Access Control address MAC, International Mobile Station Equipment Identity number IMEI, etc. In the first field CLID of the payload section of the QoS prediction request message QPREQ there is a listing of the communication links which are available in the on-board connectivity unit 160. This may be any of the V2V, V2X or V2N communication links for uplink, downlink or sidelink communication direction. In the field TR the planned travel route will be entered. In one embodiment it could be in the form of a GPS track. In the following ST field an entry about the start time is transported, i.e. the time or time period which the user has entered when he wants to start the route. In the LCR field of the payload section the link capacity requirements are listed for the different links as listed in the CLID field. This could be in the form of a latency requirement, a data rate requirement, throughput requirement or the like. Likewise, in the LRR field the link reliability requirements are listed. This could be in the form of a block error rate which is acceptable, a Doppler spread limitation or the like.

Figure 6:
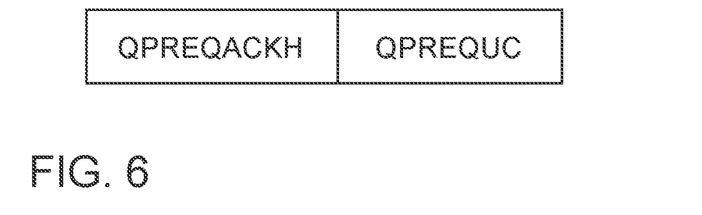
FIG. 6 shows an exemplary message format for a quality of service prediction request acknowledge message.

FIG. 6 shows the message format for the QoS prediction request acknowledgement message QPREQACK. In the header QPREQACKH the message type and the UE address is entered. The payload section is optional. If existing, the payload section comprises at least one field QPREQUC for the update conditions the communication service prediction server 220 prescribes. This may be an information entry in the form a minimum waiting time, a restriction in number of requests per time period, e.g. day, a service fee for using the communication service prediction server 220, etc. as mentioned above.

Figure 7:
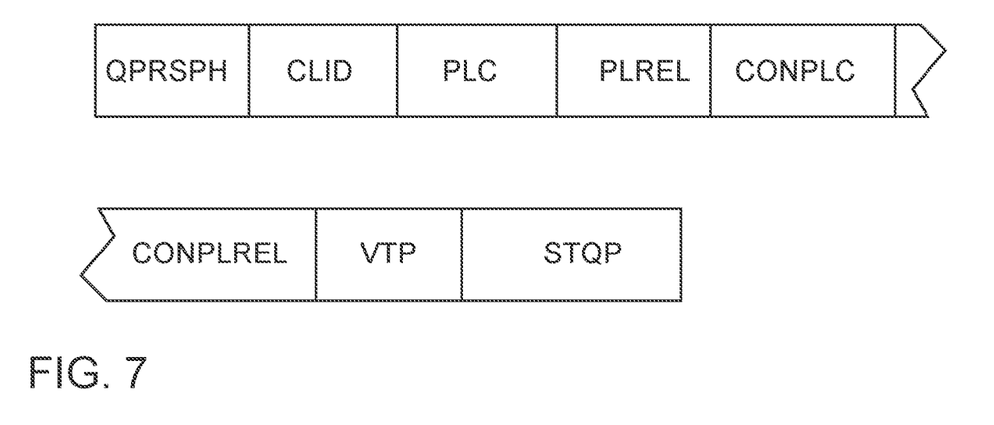
FIG. 7 shows an exemplary message format for a quality of service prediction response message.

FIG. 7 shows the message format for the QoS prediction response message QPRSP. Reference number QPRSPH denotes the message header. Again, this header includes entries for the message type and the UE address to which this message is directed. The first field CLID in payload section includes the same entries as in the CLID field of the QoS prediction request message QPREQ. The field PLC lists the predicted link capacities, i.e. a predicted latency, a predicted data rate, a predicted throughput or the like for the different links. The field PLREL lists the predicted link reliabilities for the different links e.g. in the form of a block error rate, Doppler spread or the like. The field CONPLC lists the predicted link capacity confidences. This could be in the form of a percentage value for the different parameters where 100% would mean complete reliability. The field CONPLREL lists the predicted link reliability confidences. This could be in the form of a percentage value for the different link reliability parameters where 100% would mean complete reliability. In the field VTP an entry about the validity time of the prediction values in the message is transported. Finally, in the field STQP the start time to use the predicted quality of service is provided. Typically, the value should correspond to the start time in the QoS prediction request message QPREQ.

Figure 8:
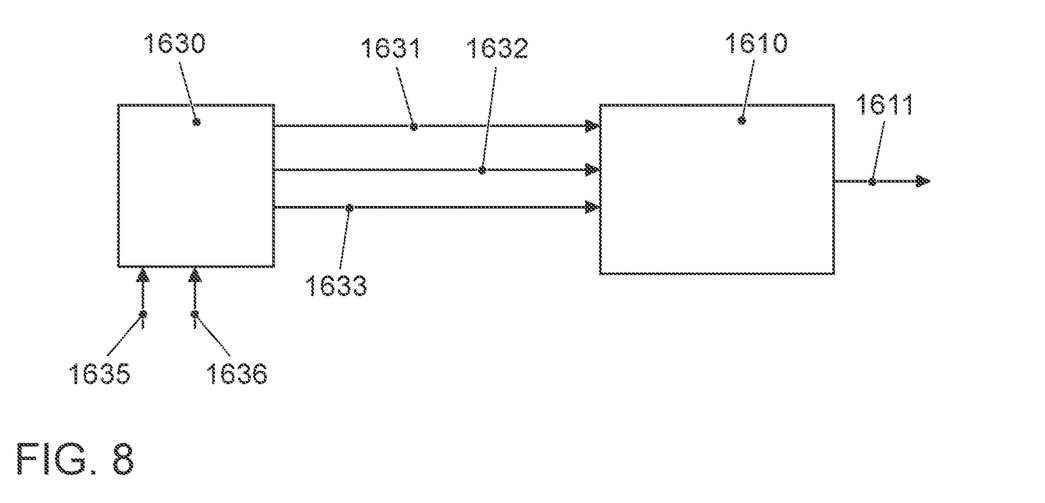
FIG. 8 shows a second block diagram of an embodiment of an apparatus for predicting a quality of service for the communication over at least one communication link of at least one communication device.

FIG. 8 shows a second embodiment for an architectural concept with concrete implementation details for the above mentioned introduction of the QoS prediction function. This embodiment discusses the case that the network slicing technology is applied which is part of the 5G mobile communication system design. The use of network slicing technology subjectively simplifies the architectural concept. In FIG. 8 the same reference signs denote equal components as in FIG. 3. In a network slicing supporting network it is possible to reserve network resources for a client making use of this service. This greatly simplifies the task of resource estimation. Therefore, the architecture as well as the estimation process running in the QoS prediction function block 1610 are much easier to implement. Since only the subscribers of the certain service have access to this service it is much easier to predict the service quality. It is part of the network slicing technology to know about the channel model and the load in the slicing network, such that in a first approach the blocks 1620, 1640 and 1650 can be spared out. The block 1630 is similar to the block in FIG. 3 in respect that it gets the same input information route and planned starting time from the QoS prediction request message QPREQ via lines 16356 and 1636 and provides the same kind of information to the QoS prediction function block 1610 via lines 1631, 1632 and 1633. It needs to be adapted to the network slicing technology such that it is aware which channels and resources are in use for the requested service. The message exchange process however stays the same as shown in FIG. 4.

It is to be understood that the proposed method and apparatus may be implemented in various forms of hardware, software, firmware, special purpose processors, or a combination thereof. Special purpose processors may include application specific integrated circuits (ASICs), reduced instruction set computers (RISCs) and/or field programmable gate arrays (FPGAs). In some embodiments, the proposed method and apparatus is implemented as a combination of hardware and software. Moreover, the software in some embodiments is implemented as an application program tangibly embodied on a program storage device. The application program may be uploaded to and executed by a machine comprising any suitable architecture. In some embodiments, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It should be understood that the elements shown in the figures may be implemented in various forms of hardware, software or combinations thereof. In some embodiments, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software based components.

It is to be further understood that, because some of the constituent system components and method steps depicted in the accompanying figures are, e.g., implemented in software, the actual connections between the system components (or the process steps) may differ depending upon the manner in which the proposed method and apparatus is programmed. Given the teachings herein, one of ordinary skill in the related art will be able to contemplate these and similar implementations or configurations of the proposed method and apparatus.

The disclosure is not restricted to the exemplary embodiments described here. There is scope for many different adaptations and developments, which are also considered to belong to the disclosure.

REFERENCE NUMBER LIST

10 Vehicle
20 Touch Screen
30 Gateway
40 Computing Device
50 Operation Element Unit
60 Memory Unit
70 Data Line to Display Unit
80 Data Line to Memory Unit
90 Data Line to Operation Element Unit
100 1. Data Bus
102 2. Data Bus
104 3. Data Bus
106 4. Data Bus
110 Multifunction Display
120 Telephone
130 Navigation System
140 Radio
150 Camera
160 On-Board Connectivity Unit
172 Engine Control Device
174 Electronic Stability Control Device
176 Transmission Control Device
182 Distance Control Device
184 Drive Train Control Device
186 Lidar-Sensor
190 On-Board Diagnosis Connector
200 Evolved Packet Core
210 Base Station
220 Communication Service Prediction Server
300 Internet
310 Roadside Unit
320 Backend Server
1610 QoS Prediction Function Block
1611 1. Line
1620 Channel Modelling Prediction Block
1621 2. Line
1630 Cells Locating Block
1631 3. Line
1632 4. Line
1633 5. Line
1634 6. Line
1635 7. Line
1636 8. Line
1640 Traffic Flow Prediction Block
1641 9. Line
1650 Surroundings Modelling Block
1651 10. Line
QPREQ Quality Of Service Prediction Request Message
QPREQACK Quality Of Service Prediction Request Acknowledge Message
QPREQU Updated Quality Of Service Prediction Request Message
QPRSP Quality Of Service Prediction Response Message
QPREQH Quality Of Service Prediction Request Message Header
CLID Communication Link Identifier
TR Travel Route
ST Start Time
LCR Link Capacity Requirement
LRR Link Reliability Requirement
QPREQACKH Quality Of Service Prediction Request Acknowledge Message Header
QPREQUC Quality Of Service Prediction Request Message
QPRSPH Quality Of Service Prediction Response Message Header
PLC Predicted Communication Link Capacity
PLREL Predicted Communication Link Reliability
CONPLC Predicted Communication Link Capacity Confidence
CONPLREL Predicted Communication Link Capacity Reliability
VTP Validity Time
STQP Service Start Time The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measured cannot be used to advantage. Any reference signs in the claims should not be construed as limiting the scope.

The invention claimed is:

1. A method for predicting a quality of service for a communication about at least one communication link of at least one communication device, the communication link being adapted to use a 5G mobile communication network with a plurality of network cells and being adapted to use network slicing technology, the method comprising:
sending from the communication device a QoS prediction request message to a communication cell localization block of a communication service prediction server, wherein the QoS prediction request message comprises in a payload section information entries for at least one planned travel route of the communication device and the communication link capacity requirements for a service the communication device is planning to make use of;

determining, by the communication cell localization block, one or more communication cells along the at least one planned travel route;

predicting, by a QoS prediction function block of the communication service prediction server, the quality of service for the at least one planned travel route on the basis of the determined one or more communication cells along the at least one planned travel route;

sending, by the communication service prediction server to the communication device, a quality of service prediction response message for the at least one travel route, and sending a QoS prediction request acknowledge message from said communication service prediction server to said communication device, wherein said QoS prediction request acknowledge message includes an information entry for the conditions the communication service prediction server will accept an updated QoS prediction request message from the same communication device.

2. The method according to claim 1, wherein the payload section includes an information entry for a planned starting time.

3. The method according to claim 1, wherein said QoS prediction request message further comprises in said payload section one or both of the information entries for the communication link identifiers the communication device is equipped with and the communication link reliability requirements for a service the communication device is planning to make use of.

4. The method according to claim 1, wherein said QoS prediction response message comprises in a payload section information entries for at least the predicted communication link capacity of said at least one communication link.

5. The method according to claim 4, wherein said QoS prediction response message further comprises in said payload section one or more of the information entries a predicted communication link reliability, a predicted communication link capacity confidence, a predicted communication link reliability, a validity time for the QoS prediction and a service start time for which the prediction is valid.

6. An apparatus for predicting a quality of service for a communication over at least one communication link of at least one communication device, the communication link being adapted to use a 5G mobile communication network with a plurality of network cells and the apparatus being adapted to use a 5G mobile communication network slicing technology for the communication link, the apparatus comprising:

a QoS prediction function block; and
a communication cell localization block; wherein
the communication cell localization block is configured to receive a QoS prediction request message from a communication device, the QoS prediction request message comprising in a payload section information entries for at least one planned travel route of the communication device and communication link capacity requirements for a service the communication device is planning to make use of; wherein the communication cell localization block is furthermore configured to determine one or more communication cells along the at least one planned travel route; wherein the QoS prediction function block is configured to forecast one or more quality of service parameters for communication along the at least one planned travel route on the basis of the determined one or more communication cells along that at least one planned travel route; wherein the QoS prediction function block is configured to send a quality of service prediction response message to the communication device, and wherein the communication cell localization block is configured to send a QoS prediction request acknowledge message to said communication device, wherein said QoS prediction request acknowledge message includes an information entry for the conditions the QoS prediction function block will accept an updated QoS prediction request message from the same communication device.

7. The apparatus according to claim 6, said apparatus further comprising a channel modelling prediction block that predicts a communication channel model profile which is forwarded to the QoS prediction function block.

8. The apparatus according to claim 6, wherein the apparatus further comprises a traffic flow prediction block that predicts the amount of other communication devices in the region along the planned travel route, said traffic flow prediction block being connected with the channel modelling prediction block.

9. The apparatus according to claim 6, wherein the apparatus further comprises a surroundings prediction block that predicts the surroundings of the communication device when travelling along the planned travel route, said traffic surroundings prediction block being connected with the channel modelling prediction block.

10. The apparatus according to claim 6, wherein a channel modelling prediction block, the communication cell localization block, and a surroundings prediction block have inputs for the information about the planned travel route and the planned starting time.

11. A communication service prediction server comprising an apparatus according to claim 6.

12. A non-transitory computer readable medium, comprising program code, which when run in a processing device performs the steps of the communication service prediction server in the method according to claim 1.

13. The method according to claim 2, wherein said QoS prediction request message further comprises in said payload section one or both of the information entries for the communication link identifiers the communication device is equipped with and the communication link reliability requirements for a service the communication device is planning to make use of.

14. The method according to claim 2, further comprising a step of sending a QoS prediction request acknowledge message from said communication service prediction server to said communication device, wherein said QoS prediction request acknowledge message includes an information entry for the conditions the communication service prediction server will accept an updated QoS prediction request message from the same communication device.

15. The method according to claim 2, wherein said QoS prediction response message comprises in a payload section information entries for at least the predicted communication link capacity of said at least one communication link.

16. The method according to claim 3, wherein said QoS prediction response message comprises in a payload section information entries for at least the predicted communication link capacity of said at least one communication link.

17. The method according to claim 1, wherein said QoS prediction response message comprises in a payload section information entries for at least the predicted communication link capacity of said at least one communication link.

18. The apparatus according to claim 7, wherein the apparatus further comprises a traffic flow prediction block that predicts the amount of other communication devices in the region along the planned travel route, said traffic flow prediction block being connected with the channel modelling prediction block.

\* \* \* \* \*